United States Patent [19]

Komuro

[11] 4,100,435
[45] Jul. 11, 1978

[54] PHASE CONTROL APPARATUS
[75] Inventor: Katsu Komuro, Katsuta, Japan
[73] Assignee: Hitachi, Ltd., Japan
[21] Appl. No.: 749,962
[22] Filed: Dec. 13, 1976
[30] Foreign Application Priority Data
Dec. 25, 1975 [JP] Japan .................................. 50-156250
[51] Int. Cl.² ............................................... H03K 5/15
[52] U.S. Cl. ................................ 307/262; 307/252 P; 307/252 Q; 307/252 UA; 307/282
[58] Field of Search ........ 307/252 P, 252 Q, 252 UA, 307/282, 262

[56]   References Cited
U.S. PATENT DOCUMENTS

| 3,046,414 | 7/1962 | Meissen | 307/262 |
| 3,175,076 | 3/1965 | Fox et al. | 307/252 Q |
| 3,265,955 | 8/1966 | Brown | 307/262 X |
| 3,348,129 | 10/1967 | Schonholzer | 307/282 X |
| 3,443,204 | 5/1969 | Baker | 307/252 UA |

Primary Examiner—John S. Heyman
Attorney, Agent, or Firm—Craig & Antonelli

[57] ABSTRACT

A phase control apparatus is disclosed wherein a pair of transistors are alternately switched by an A.C. signal source. Each of the transistors is connected in series with an auxiliary thyristor and a primary winding of a pulse transformer to a D.C. power supply. Each of the auxiliary thyristors is fired by a magnetic phase shifter having an A.C. winding connected between a positive terminal of the D.C. power supply and a gate of the auxiliary thyristor. Connected to secondary windings of the pair of pulse transformers are gate circuits of a pair of main thyristors to which an A.C. voltage which is substantially in synchronism with the A.C. signal source is applied.

17 Claims, 4 Drawing Figures

PHASE CONTROL APPARATUS

The present invention relates to an improvement in a phase control apparatus using a magnetic phase shifter.

As is well known, a magnetic phase shifter utilizes a principle of a magnetic amplifier and includes at least a saturable core and an A.C. winding (sometimes referred to as an output winding) and a control winding wound on the core. When the A.C. winding is connected between an A.C. power supply and a load and the a D.C. voltage is applied to a control winding, a phase of saturation of the core can be controlled in accordance with the change of the D.C. voltage. As the core saturates, the impedance of the A.C. winding suddenly decreases so that a phase controlled voltage may be applied to the load. Accordingly, it has been widely practiced to effect phase control by connecting a gate circuit of a main thyristor connected to an A.C. circuit, as the load.

The A.C. power supply connected to the A.C. winding of the magnetic phase shifter must be in synchronism with the A.C. power supply connected to the main thyristor. To this end, it has been a common practice to use a sinusoidal wave A.C. signal as a synchronizing signal source, which signal is produced by stepping down the A.C. voltage applied to the main thyristor.

However, the following disadvantages are included when a sinusoidal wave A.C. signal is used at the synchronizing signal source of the magnetic phase shifter.

(1) The output voltage of the phase shifter changes in accordance with a phase angle.

(2) The range of phase control is narrow.

(3) The characteristic of the phase shifter is unstable.

In order to overcome these disadvantages, it is desirable to use a square wave A.C. signal as the synchronizing signal source of the magnetic phase shifter. It has been proposed in the copending U.S. patent application Ser. No. 663,864 to use a transistor inverter for that purpose. Such a transistor inverter usually includes at least a D.C. power supply, an inverter transistor, and a pair of transistors which are switched at the end of every half-cycle of an A.C. signal which is synchronized with a main circuit. A voltage across a secondary winding of the inverter transformer is used as the synchronizing signal source of the phase shifter.

As is well known, the inverter encounters a problem of saturation of the inverter transformer. Namely, if one of the pair of transistors which is rendered conductive first at the restart is the same as that which has been rendered conductive at the stop of the previous inverter operation, the inverter transformer is magnetized in one direction and hence it is saturated. As a result, the one transistor shortcircuits the D.C. power supply to cause a rush current to flow. Accordingly, it is required to provide a complex means to prevent biased magnetization of the inverter transformer, as is well known in the art of the inverter or the use such a transistor of a sufficiently large current capacity to withstand the rush current. In any case, those approaches necessarily result in an uneconomical phase control apparatus.

It is a primary object of the present invention to provide an economic phase control apparatus of a magnetic phase shifter type.

According to one aspect of the present invention there is provided a phase control apparatus comprising a synchronizing signal source, first and second switching devices which are alternately switched by the synchronizing signal source, a D.C. power supply, first and second magnetic phase shifters, a first load connected in a first closed circuit including said D.C. power supply, said first switching device and an A.C. winding of said first magnetic phase shifter, and a second load connected in a second closed circuit including said D.C. power supply, said second switching device and an A.C. winding of said second magnetic phase shifter.

According to a preferable embodiment of the present invention, the respective gate circuits of first and second thyristors are connected as the first and second loads mentioned above.

According to another preferable embodiment of the present invention, first and second pulse transformers are connected in series with the above-mentioned first and second thyristors, respectively, so that first and second main thyristors are fired through the respective pulse transformers.

The above and other objects, features and advantages of the present invention will become more apparent from the following detailed description of the preferred embodiments of the invention when taken in conjunction with the accompanying drawings, in which.

Figure 1:
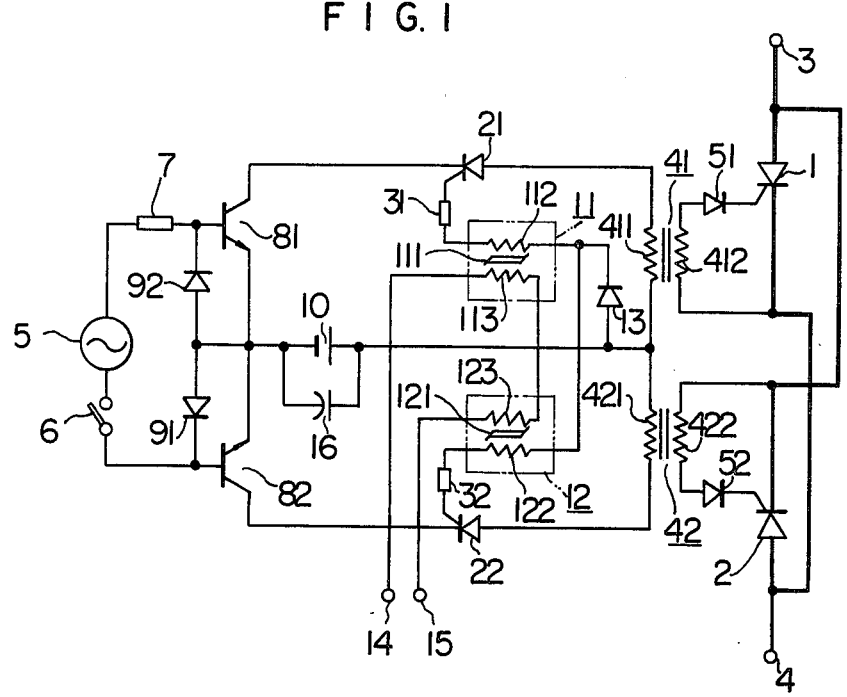
FIG. 1 is an electrical circuit diagram of one embodiment of a phase control apparatus of the present invention.

Referring now to FIG. 1, thick lines show a main circuit in which main thyristors 1 and 2 are connected in reverse-parallel relation between terminals 3 and 4 of an A.C. active circuit. A phase shifter, for example, is used to phase control the parallel-opposing thyristors.

A construction of the phase shifter is explained below.

A synchronizing signal source 5 generates an A.C. voltage which is in synchronism with an A.C. signal applied between the terminals 3 and 4. In a usual practice, the A.C. voltage applied between the terminals 3 and 4 is stepped down by a transformer to provide the synchronizing signal source 5. The synchronizing signal source 5 is connected to a pair of transistors 81 and 82 through a switch 6 and a resistor 7 to alternately switch the transistors. Namely, during a positive half-cycle period of the voltage from the synchronizing signal source 5, the first transistor 81 is turned on by a closed circuit which emanates from the signal source 5 through the resistor 7, a base-emitter junction of the first transistor 81, a first diode 91 and the switch 6 and goes back to the signal source 5. On the other hand, during a negative half-cycle period of the voltage from the signal source 5, the second transistor 82 is turned on by a closed circuit which emanates from the signal source 5 through the switch 6, a base-emitter junction of the second transistor 82, a second diode 92 and the resistor 7 and goes back to the signal source 5.

A D.C. power supply 10 feeds a first load through an A.C. winding 112 of a first magnetic phase shifter 11 and the first transistor 81. The D.C. power supply 10 also feeds a second load through an A.C. winding 122 of a second magnetic phase shifter 12 and the second transistor 82. In the illustrated embodiment, a gate circuit of a thyristor 21 is connected as the first load and a gate circuit of a second thyristor 22 is connected as the second load. That is, a first closed circuit is constituted by the D.C. power supply 10, a diode 13, the A.C. winding 112 of the magnetic phase shifter 11, a resistor 31, the gate circuit of the thyristor 21 (load), the transistor 81 and back to the D.C. power supply 10. On the other hand, a second closed circuit is constituted by the D.C. power supply 10, the diode 13, the A.C. winding 122 of the magnetic phase shifter 12, a resistor 32, gate circuit of the thyristor 22 (load), the transistor 82 and back to the D.C. power supply 10.

The magnetic phase shifters 11 and 12 include saturable cores 111 and 121, and control windings 113 and 123, respectively. D.C. control inputs are applied from terminals 14 and 15 to control windings 113 and 123 of the magnetic phase shifters 11 and 12, respectively.

The thyristors 21 and 22 are connected between the D.C. power supply 10 and the respective first and second transistors 81 and 82 through pulse transformers 41 and 42 as their loads. In this case, a third closed circuit is constituted by the D.C. power supply 10, the primary winding 411 of the pulse transformer 41, the thyristor 21, the transistor 81 and back to the D.C. power supply 10 while a fourth closed circuit is constituted by the D.C. power supply 10, the primary winding 421 of the pulse transformer 42, the thyristor 22, the transistor 82 and back to the D.C. power supply 10. Alternatively, the thyristors 21 and 22 are connected in an A.C. circuit (not shown) to be additionally loaded.

Voltages across the secondary windings 412 and 422 of the pulse transformer 41 and 42 are applied to the gate circuits of the main thyristors 1 and 2 through diodes 51 and 52, respectively.

The operation of the circuit will be now described.

When the synchronizing signal source 5 is connected by turning on the switch 6, the first and second transistors 81 and 82 are alternately turned on as described above. When the transistor 81 is turned on, the voltage of the D.C. power supply 10 is applied between the anode and cathode of the thyristor 21 through the above-mentioned third closed circuit. At the same time, the voltage of the D.C. power supply 10 is also applied to the A.C. winding 112 of the first magnetic phase shifter 11 through the above-mentioned first closed circuit. As a result, the saturable core 111 of the first magnetic phase shifter 11 saturates with a phase angle which is determined in accordance with a control input applied to the control winding 113 so that the inpedance of the A.C. winding 112 suddenly decreases. Thus, a current flows from the D.C. power supply 10 to the gate circuit of the thyristor 21 through the above-mentioned first closed circuit and the thyristor 21 is rendered conductive. As a result, a voltage is applied across the primary winding 411 of the pulse transformer in the third closed circuit so that a voltage is induced across the secondary winding 412 to fire the main thyristor 1.

When the polarity of the voltage of the synchronizing signal source 5 changes, the first transistor 81 is turned off so that the first and third closed circuits are opened. At the same time, the second transistor 82 is turned on so that the main thyristor 2 is fired at a desired phase angle in a similar manner to that described above.

As is well known, it is very easy to avoid the biased magnetization problem in a pulse transformer. This may be attained by applying a D.C. current to a reset winding provided therein or by enlarging the gap formed in the core thereof.

With the above construction, the A.C. voltage waveforms applied to the respective A.C. windings 112 and 122 of the magnetic phase shifters 11 and 12 are square waves, which result in a number of advantages of the magnetic phase shifter as described above. Furthermore, no inverter transformer is required and the first and second transistors 81 and 82 may be of smaller current capacity. No complex and expensive means to prevent the saturation of the inverter transformer is required. As a result, economization of the phase control apparatus is attained.

Furthermore, since the circuit is arranged such that the A.C. winding circuits of the magnetic phase shifters are turned on and off by the switching devices such as the transistors 81 and 82, jumping of the magnetic phase shifter in a reset region can be prevented to insure a stable operation of the phase shifter.

Assuming that the control inputs applied to the terminals 14 and 15 include large ripples to cause large fluctuations in the voltages across the control windings 113 and 123, the magnetic phase shifter which is in the gated period is not at all affected by such fluctuations because it is clamped by the A.C. voltage applied to its A.C. winding, as is well known. On the other hand, in a magnetic phase shifter which is in the reset region, there would generally be a risk of voltage application to the load (e.g. gate-cathode of the thyristor 21 or 22.), but in the apparatus of the present invention there is no such risk since the circuit is blocked by the first or second switching device 81 or 82. Accordingly, jumping of the phase shifter can be effectively prevented.

According to a preferred embodiment of the present invention, a capacitor 16 is connected in parallel with the D.C. power supply 10. Since the capacitor 16 is continuously charged by the voltage of the D.C. power supply 10 the voltage across the D.C. power supply 10 does not substantially deviate even if there occurs a cause of somewhat deviation in the voltage of the D.C. power supply 10. Thus, a sharp rise characteristic can be given to the output of the magnetic phase shifter.

Furthermore, as shown in the drawing, when the same D.C. power supply 10 feeds the third closed circuit including the primary winding 411 of the pulse transformer 41, the thyristor 21 and the transistor 81, the rise of the voltage across the pulse transformer 41 is also sharpened by the provision of the capacitor 16. Accordingly, operation speed of the overall circuit can be increased with only one capacitor. Further there is a little power loss because of a small charge/discharge current of the capacitor.

According to the above embodiment of the present invention, the control windings 113 and 123 are connected in series with each other. This expands the range of phase control of the magnetic phase shifter. Namely, when the transistor 81 or 82 turns off, the current which has been flowing through the A.C. winding 112 or 122 suddenly decreases to produce a spike voltage. This spike voltage can be applied to the A.C. winding of the other magnetic phase shifter through the low impedance control circuit so that each one of the magnetic phase shifters cooperates to expand the range of phase control of the other magnetic phase shifter.

Figure 2:
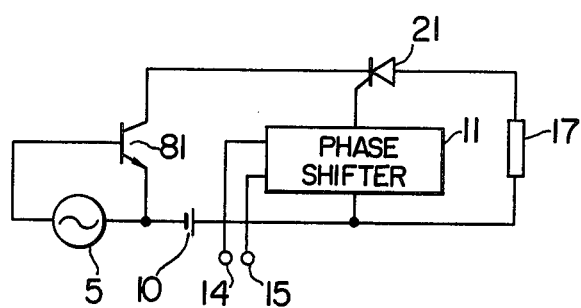
FIG. 2 is an electrical circuit diagram showing a principle of the present invention.

FIG. 2 is an electrical circuit diagram showing another embodiment of the present invention. In FIG. 2, a closed circuit is constituted by the D.C. power supply 10, the load 17, the thyristor 21 and the transistor 81. The A.C. voltage source 5 is connected between the base and the emitter of the transistor 81. The phase shifter 11 for firing the thyristor 21 is provided.

The on-off operation of the transistor 81 is controlled by the A.C. voltage source 5, and the voltage of the D.C. power supply 10 is applied to the phase shifter 11 only when the transistor 81 conducts. Thus, the thyristor 21 can be fired at a phase determined in accordance with the input applied to the control input terminals 14 and 15 of the phase shifter 11. As a result, a phase controlled voltage is applied to the load 17 and the mean voltage thereof is proportional to the control inputs. When the voltage of the A.C. power supply 5 reverses, the transistor 81 is turned off to block the feeding to the magnetic phase shifter 11 and turn off the thyristor 21.

Figure 3:
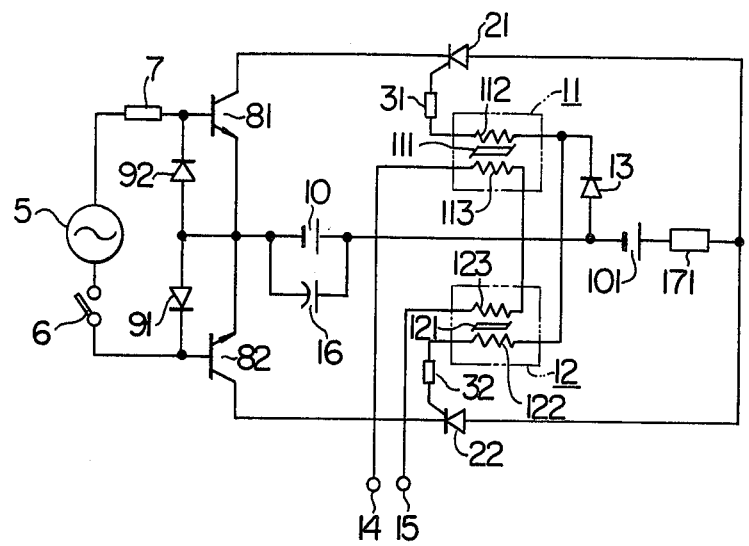
FIG. 3 shows an electrical circuit diagram of another embodiment of the present invention.

By slightly modifying the apparatus of FIG. 1, a DC-DC converter can be constructed. FIG. 3 shows an example of the DC-DC converter. The pulse transformers 41 and 42 of FIG. 1 have been eliminated and a load 171 is connected in a common path to the third and fourth closed circuits. An additional second D.C. power supply 101 may be provided to establish a sufficiently high voltage source to the load 171. The other component elements serve to operate in the same manner as FIG. 1 and the detailed description is deleted. With this arrangement, a D.C. voltage which changes in proportion with a D.C. control input applied to the terminals 14 and 15 may be applied to the load 171.

Figure 4:
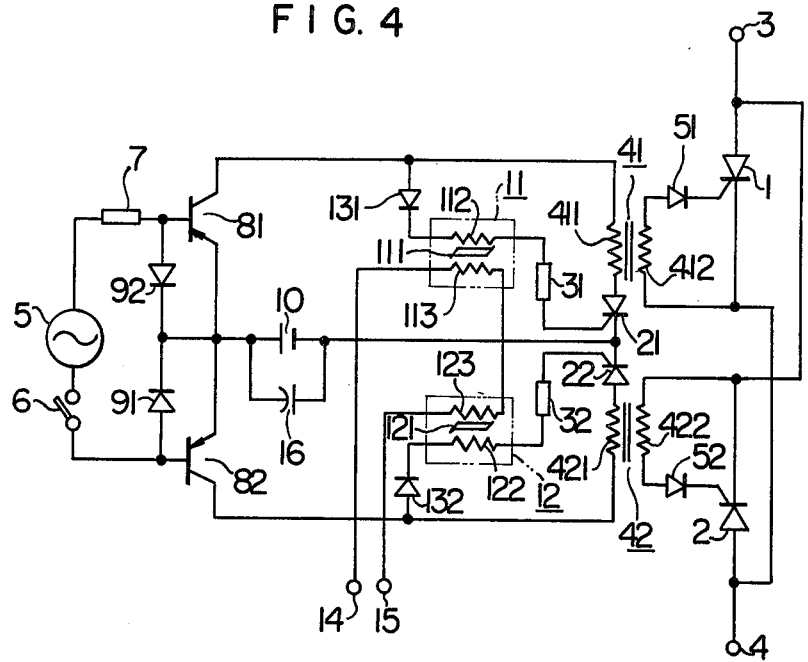
FIG. 4 shows an electrical circuit diagram of still another embodiment of the present invention.

FIG. 4 shows another modification of the embodiment of FIG. 1 according to the present invention, in which the transistors 81 and 82 are of PNP type. The circuit of FIG. 4 differs from that of FIG. 1 in that the positions of the loads (pulse transformers in the illustrated embodiment) 41 and 42 and the thyristors 21 and 22 have been exchanged. This is because attention has been paid to exclude the load from the first and second closed circuits. That is, if the load is connected to the cathodes of the thyristors 21 and 22, the load, e.g. the primary winding 411 of the pulse transformer 41 would be connected in the first closed circuit including the D.C. power supply 10, the transistor 81, the diode 131, the A.C. winding 112, the resistor 31, the gate circuit of the thyristor 21 and back to the D.C. power supply 10. When the load is connected to the gate circuit of the thyristor, the impedance of the load, particularly the reactance thereof makes the firing of the thyristor difficult. For this reason, the load is connected to each of the anodes of the thyristors 21 and 22. Numeral 132 denotes a diode.

What is claimed is:

1. A phase control apparatus comprising:
    a synchronizing signal source;
    first and second switching devices adapted to be alternately switched by said synchronizing signal source;
    a D.C. power supply;
    first and second magnetic phase shifters each having a saturable core, an A.C. winding, and a control winding, and A.C. and control windings being wound on said core;
    a first load connected in a first closed circuit including said D.C. power supply, said first switching device, and said A.C. winding of said first magnetic phase shifter; and
    a second load connected in a second closed circuit including said D.C. power supply, said second switching device, and said A.C. winding of said second magnetic phase shifter;
    wherein pulses having predetermined phase angles with respect to the phase angle of the signal from said synchronizing signal source are applied to said first and second loads, said phase angles being determined in accordance with the occurrence of saturation of said saturable cores in said first and second magnetic phase shifters.

2. A phase control apparatus according to claim 1, wherein a capacitor is connected in parallel with said D.C. power supply.

3. A phase control apparatus according to claim 1, wherein the respective control windings of said first and second magnetic phase shifters are connected in series with each other.

4. A phase control apparatus according to claim 1, wherein said first and second switching devices comprise first and second transistors, respectively, said synchronizing signal source being connected between the respective bases of said first and second transistors, the respective emitters of said first and second transistors being connected in common, and first and second diodes connected across the respective base-emitter junctions of said first and second transistors.

5. A phase control circuit according to claim 1, wherein said first and second loads comprise the gate circuits of first and second thyristors.

6. A phase control apparatus according to claim 5, comprising:
    a gate circuit of a third thyristor connected to another signal source which is in synchronism with said first-mentioned synchronizing signal source, said third thyristor gate circuit being connected in a third closed circuit including said D.C. power supply, said first switching device, and the anode and cathode of said first thyristor; and
    a gate circuit of a fourth thyristor connected to another signal source which is in synchronism with said first-mentioned synchronizing signal source, said fourth thyristor gate circuit being connected in a fourth closed circuit including said D.C. power supply, said second switching device, and the anode and cathode of said second thyristor.

7. A phase control apparatus comprising:
    a closed circuit including a D.C. power supply, a load, the anode and cathode of a thyristor and the emitter and collector of a transistor;
    an A.C. power supply connected between a base and an emitter of said transistor; and
    a phase shifter connected to the gate of said thyristor for firing said thyristor in accordance with pulses having a predetermined phase angle with respect to the phase angle of the A.C. signal from said A.C. power supply.

8. A phase control apparatus according to claim 7, wherein said phase shifter comprises a magnetic phase shifter including a saturable core, an A.C. winding, and a control winding, said A.C. and control windings being wound on said core, said A.C. winding being connected in a closed circuit including said D.C. power supply, the gate circuit of said thyristor, and said transistor.

9. A phase control apparatus according to claim 7, wherein said load is a gate circuit of another thyristor connected to another A.C. power supply which is in synchronism with said first-mentioned A.C. power supply.

10. A phase control apparatus comprising:
    a synchronizing signal source;
    first and second switching devices adapted to be alternately switched by said synchronizing signal source;

a D.C. power supply;

first and second magnetic phase shifters each having a saturable core, an A.C. winding, and a control winding, said A.C. and control windings being wound on said core;

a first thyristor with its gate circuit connected in a first closed circuit including said D.C. power supply, said first switching device, and said A.C. winding of said first magnetic phase shifter; and a second thyristor with its gate circuit connected in a second closed circuit including said D.C. power supply, said second switching device, and said A.C. winding of said second magnetic phase shifter.

11. A phase control apparatus according to claim 10, wherein the anode and cathode of said first thyristor are connected in a third closed circuit including said D.C. power supply and said first switching device, and wherein the anode and cathode of said second thyristor are connected in a fourth closed circuit including said D.C. power supply and said second switching device.

12. A phase control apparatus according to claim 10, comprising a second D.C. power supply, the anode and cathode of said first thyristor being connected in a closed circuit including said first and second D.C. power supplies and said first switching device, the anode and cathode of said second thyristor being connected in a closed circuit including said first and second D.C. power supplies and said second switching device.

13. A phase control apparatus according to claim 11 comprising the respective primary windings of first and second pulse transformers connected in said third and fourth closed circuits, and third and fourth thyristors adapted to be fired by voltages across the respective secondary windings of said first and second pulse transformers.

14. A phase control apparatus according to claim 11, wherein said respective loads are connected to anodes of said first and second thyristors in said third and fourth closed circuits.

15. A phase control apparatus according to claim 13, wherein the respective primary windings of said pulse transformers are connected to the anodes of said first and second thyristors.

16. A phase control apparatus according to claim 11, wherein said loads are connected in a path common to said third and fourth closed circuits.

17. A phase control apparatus comprising:

a magnetic phase shifter having a saturable core, an A.C. winding, and a control winding, said A.C. and control windings being wound on said core;

an A.C. power supply;

switching means alternately changing its conduction state between an on-state and an off-state in accordance with the A.C. voltage of said A.C. power supply;

a D.C. power supply; and a thyristor, the gate and the cathode of said thyristor being connected to a closed circuit including said D.C. power supply, said A.C. winding of said magnetic phase shifter, and said switching means, said thyristor being switched to an on-state by pulses applied through said closed circuit to said thyristor gate, said pulse having a predetermined phase angle with respect to the phase angle of the A.C. voltage of said A.C. power supply, said phase angle being determined in accordance with the occurrence of saturation of said saturable core in said magnetic phase shifter.

* * * * *